US008163159B2

(12) United States Patent
Sjong

(10) Patent No.: US 8,163,159 B2
(45) Date of Patent: Apr. 24, 2012

(54) ENCLOSING MANUFACTURE WITH A MAGNESIUM SACRIFICIAL ANODE FOR CORROSION PROTECTION

(75) Inventor: Angele Sjong, Louisville, CO (US)

(73) Assignee: Empire Technology Development LLC, Wilmington, DE (US)

( * ) Notice: Subject to any disclaimer, the term of this patent is extended or adjusted under 35 U.S.C. 154(b) by 268 days.

(21) Appl. No.: 12/626,017

(22) Filed: Nov. 25, 2009

(65) Prior Publication Data

US 2011/0123860 A1    May 26, 2011

(51) Int. Cl.
*C23F 13/10* (2006.01)

(52) U.S. Cl. ............... 205/740; 204/196.01; 204/196.1; 204/196.18; 204/196.23; 204/196.24; 204/196.25; 204/196.3; 204/196.37; 205/730; 205/731; 205/732; 205/733

(58) Field of Classification Search ............. 204/196.01, 204/196.1, 196.18, 196.23, 196.24, 196.25, 204/196.3, 196.37; 205/730, 731, 733, 732, 205/740

See application file for complete search history.

(56) References Cited

U.S. PATENT DOCUMENTS

| | | | |
|---|---|---|---|
| 1,958,765 A | | 5/1934 | Perkins |
| 2,941,935 A | | 6/1960 | Miller et al. |
| 3,281,008 A | | 10/1966 | D'Andrea |
| 4,013,811 A | * | 3/1977 | Maruska ............... 426/244 |
| 4,195,006 A | | 3/1980 | Brown et al. |
| 4,202,750 A | * | 5/1980 | Khoury ............... 204/196.19 |
| 5,728,275 A | * | 3/1998 | Twigg ............... 204/196.23 |
| 6,540,886 B1 | | 4/2003 | Russell |
| 7,186,321 B2 | | 3/2007 | Benham |
| 2007/0036903 A1 | | 2/2007 | Mayr et al. |
| 2011/0123860 A1 | | 5/2011 | Sjong |

OTHER PUBLICATIONS

Suffet, I. H., "Advances in Taste-and-Odor Treatment and Control," American Water Works Research Foundation, 1995, p. 259.
Schachter, M., "The Importance of Magnesium to Human Nutrition," Schachter Center for Complemetary Medicine, 1996, 3 pages.
Doege, E. et al., "Sheet Metal Forming of Magnesium Wrought Alloys—Formability and Process Technology," Journal of Materials Processing Technology 115, 2001, pp. 14-19.
Schuyler, R., "Longevity: Anodes," WaterHeaterRescue.com, Nov. 9, 2005, 4 pages.
Bliss, R. M., "Lack Energy? Maybe It's Your Magnesium Level," Agricultural Research Magazine, May 4, 2004, 2 pages.
University of Maryland Medical Center, "Magnesium," Aug. 22, 2007, 5 pages.
Wester, P. O., "Magnesium," The American Journal of Clinical Nutrition, 1987, pp. 1305-1312, No. 45.
Wikipedia, "Cathodic Protection," Wikimedia Foundation, Inc., Jan. 23, 2004, 5 pages.
Davy, Sir H., "On the Corrosion of Copper Sheeting by Sea Water, and on Methods of Preventing This Effect; and on Their Application to Ships of War and Other Ships," Phil. Trans. R. Soc. Lond., Jan. 22, 1824, pp. 151-158.

(Continued)

*Primary Examiner* — Bruce Bell
(74) *Attorney, Agent, or Firm* — Schwabe, Williamson & Wyatt, P.C.

(57) ABSTRACT

Techniques generally describe articles of enclosing manufacture and methods related to containers including a magnesium sacrificial anode for corrosion protection. Example articles of enclosing manufacture may include a liner or a rod that is configured as a sacrificial anode to protect a metallic side or end wall of the enclosing manufacture from corrosion. Other embodiments may be disclosed and claimed.

10 Claims, 7 Drawing Sheets

OTHER PUBLICATIONS

Davy, Sir H., "Additional Experiments and Observations on the Application of Electrical Combinations to the Preservation of the Copper Sheathing of Ships, and to Other Purposes," Phil. Trans. R. Soc. Lond., Jun. 17, 1824, pp. 242-246.

Davy, Sir H., "Further Researches on the Preservation of Metals by Electrochemical Means," Phil. Trans. R. Soc. Lond., Jun. 9, 1825, pp. 328-346.

MPMA, "Protective and Decorative Coatings," Metal Packaging Manufacturers Association, 2008, 3 pages.

Brand, J.W.L.F. et al., "Impressed-current Anodes for the Application of Cathodic Protection," in Corrosion, by Sheir, L.L. et al., 1994, Section 10:3, pp. 56-92, 3rd Edition.

Jones, D. A., "Impressed Current Cathodic Protection," Principles and Prevention of Corrosion, 1996, pp. 442-444, 2nd Edition.

The Can Manufacturers Institute, Inc., "Monthly Metal Can Shipments Report 2005," Feb. 10, 2006, 9 pages.

CTV.ca News Staff et al., "U.S. Food Company Says BPA-free Cans Possible," CTVglobemedia, May 29, 2008, 1 page.

Food Standards Agency, "Bisphenol-A (BPA)," UK Government Department Information Sheet, Mar. 23, 2010, 2 pages.

Business Wire, "Metal Packaging Industry Welcomes FDA Statement on Bisphenol A (BPR)," Apr. 29, 2008, 2 pages.

Van Laack, R., "NRDC Citizen Petition Requests that FDA Prohibit All Use of Bisphenol A as a Food Additive," FDA Law Blog of Hyman, Phelps & McNamara, P.C., Dec. 18, 2008, 2 pages.

International Trade Centre UNCTAD/WTO, "Export Packaging Note No. 14: Technical Notes on the Use of Metal Cans," 30 pages.

Jacoby, M., "Carbon Nanotubes," Chemical & Engineering News, Dec. 17, 2008, 1 page.

Munguia-Lopez, E. et al., "Migration of Bisphenol A (BPA) from Epoxy Can Coatings to Jalapeno Peppers and an Acid Food Stimulant," Journal of Agricultural and Food Chemistry, Nov. 2002, pp. 7299-7302, No. 50.

Goodson, A. et al., "Migration of Bisphenol A from Can Coatings—Effects of Damage, Storage Conditions and Heating," Food Additives and Contaminants, Oct. 2004, pp. 1015-1026, vol. 21, No. 10.

Tsai, W.T., "Human Health Risk on Environmental Exposure to Bisphenol-A: A Review," Journal of Environmental Science and Health Part C, 2006, pp. 225-255.

Simal-Gandara, J. et al., "A Critical Review of the Quality and Safety of BADGE-Based Epoxy Coatings for Cans: Implications for Legislation on Epoxy Coatings for Food Contact," Critical Reviews in Food Science and Nutrition, 1998, pp. 675-688.

Montanari, A. et al., "Quality of Organic Coatings for Food Cans: Evaluation Techniques and Prospects of Improvements," Progress in Organic Coatings, 1996, pp. 159-165, No. 29.

Ben-Jonathan, N. et al., "Xenoestrogens: The Emerging Story of Bisphenol A," Trends Endocrinol. Metab., 1998, pp. 124-128, vol. 9, No. 3.

Oldring, P. et al., "Packaging Materials: 7. Metal Packaging for Foodstuffs," ILSI Europe, Sep. 2007, 44 pages.

ICIS.com, "Abbreviations," Aug. 28, 2006, 1 page.

Plastics News, "Panel Blasts FDA Stance on BPA's Safety," Crain Communications, Nov. 3, 2008, 2 pages.

International Search Report and Written Opinion, issued in International Patent Application No. PCT/US2010/058038, mailed Jan. 18, 2011, 9 pages.

International Search Report and Written Opinion, issued in International Patent Application No. PCT/US2010/058057, mailed Jan. 20, 2011, 15 pages.

Notice of Allowance, issued in U.S. Appl. No. 12/625,962, mailed Aug. 19, 2011, 7 pages.

* cited by examiner

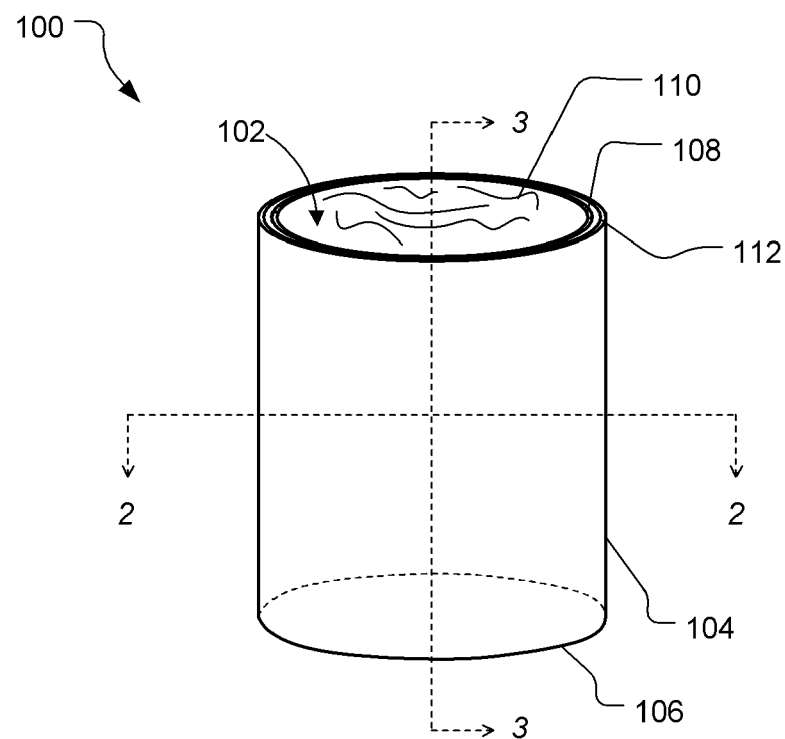
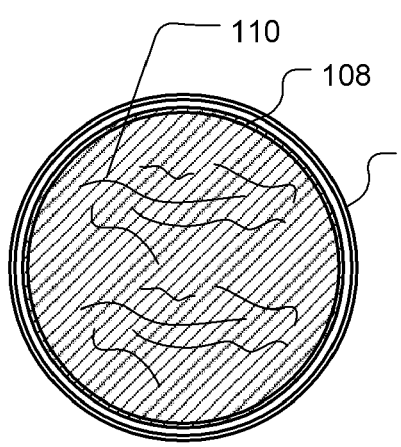
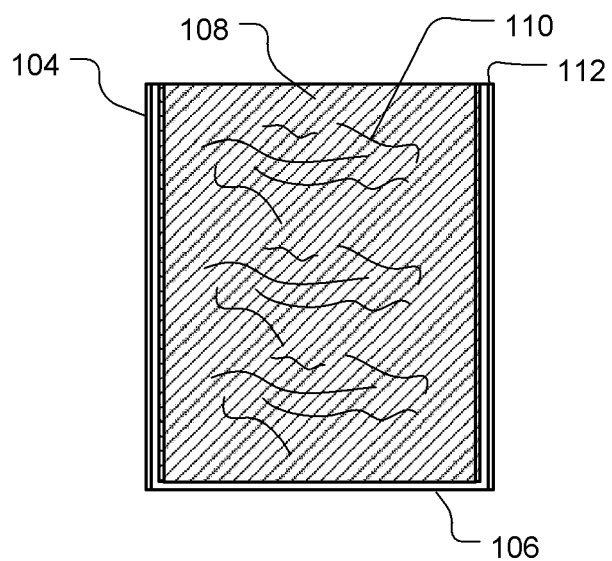
Figure 1
Figure 2
Figure 3

ENCLOSING MANUFACTURE WITH A MAGNESIUM SACRIFICIAL ANODE FOR CORROSION PROTECTION

RELATED APPLICATION

This application is related to Ser. No. 12/625,962, entitled "Impressed Current Protection for Food or Beverage Containers," filed contemporaneously Nov. 25, 2009.

BACKGROUND

Steel and aluminum cans may be used for storing or distributing food and beverages, and these cans may be treated to minimize corrosion of the cans. Bisphenol A (BPA)-based phenolic epoxy coatings may be used to protect steel and aluminum cans from corrosion, but overtime, BPA may be released into food and beverages. Recently, there may be health concerns with the release. Tinplate (tin-coated steel) may be used to protect steel from corrosion, but the corrosion protection may be lost when the can is opened and exposed to oxygen.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 illustrates a perspective view of an enclosing manufacture having a container including a magnesium sacrificial anode configured as a sleeve for corrosion protection;

FIG. 2 illustrates a cross-sectional view of the container of FIG. 1;

FIG. 3 illustrates another cross-sectional view of the container of FIG. 1;

Figure 4:
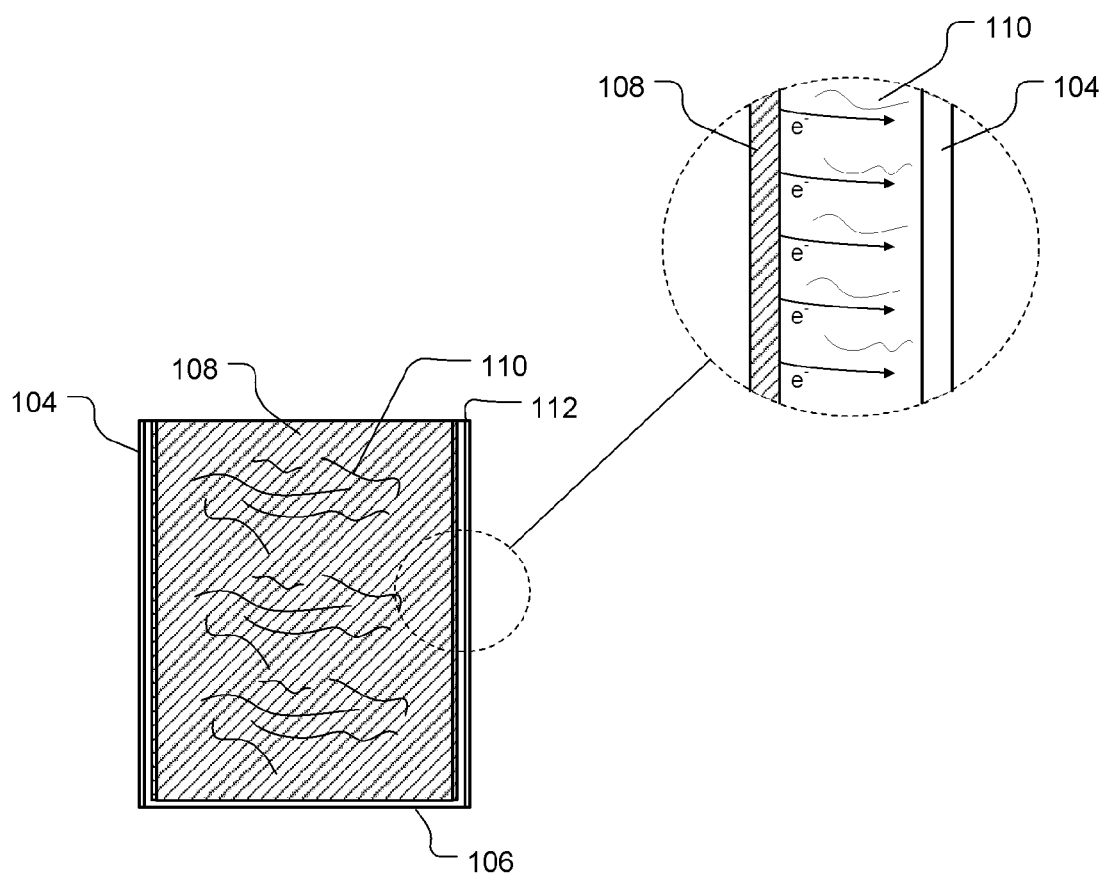
FIG. 4 illustrates a simplified representation of a redox reaction that may occur between a sacrificial anode, a container cathode, and a food or beverage electrolyte.

all arranged in accordance with various embodiments of the present disclosure.

DETAILED DESCRIPTION OF EMBODIMENTS

The following description sets forth various examples along with specific details to provide a thorough understanding of claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn to articles of manufacture and methods related to a container including a magnesium sacrificial anode. In the following detailed description, reference is made to the accompanying drawings which form a part hereof, and in which are shown by way of illustration embodiments in which embodiments may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents Embodiments of the present disclosure provide a container including a magnesium sacrificial anode for corrosion protection that may, in various embodiments, reduce or replace the use of bisphenol-A (BPA)-based coatings or tinplating sometimes used to protect containers susceptible to corrosion.

Various embodiments may include a container having an inner space defined by a side wall and an end wall of the container, at least one of the side wall and the end wall being formed of a metal. A liner comprising magnesium may be housed within the inner space of the container, and the liner may be configured to act as a sacrificial anode to protect the metallic side or end wall from corrosion. The liner may be a sleeve, a deep-drawn sheet, or a wire coil lining at least a portion of the inner space. In various embodiments, instead of a liner, a container may include a rod comprising magnesium and housed within the inner space of the container, wherein the rod is configured to act as a sacrificial anode to protect the metallic side or end wall from corrosion.

FIG. 1 illustrates a perspective view of an enclosing manufacture having a container including a magnesium sacrificial anode for corrosion protection, arranged in accordance with at least some embodiments of the present disclosure. A cross-sectional view of the container taken along line 2-2 is illustrated in FIG. 2, while a cross-sectional view of the container taken along line 3-3 is illustrated in FIG. 3.

As illustrated, the container 100 may include an inner space 102 defined by a side wall 104 and an end wall 106 of the container 100. The container 100 may be used for storing any type of product 110 suitable for storage or distribution in cans. Food and beverages, for example, may be typical products suitable for use with the container 100 and other containers described herein.

A liner 108 may be housed within the inner space 102 of the container 100, and may act as a sacrificial anode to protect the container 100 from corrosion when the container 100 is filled with the product 110. At least one of the side wall 104 and the end wall 106 may be formed of a metal such that the metal, the liner 108, and a product 110 disposed within the container 100 form a galvanic cell arrangement in which the metal may act as a cathode, the liner 108 may act as sacrificial anode, and the product 110 may act as an electrolyte.

A simplified representation of the redox reaction that may occur for at least some embodiments of the present disclosure is illustrated at FIG. 4. As illustrated, to implement the galvanic cell, the liner 108 (the sacrificial anode) may be formed of a metal that is more active (easily oxidized) than the metal of the side wall 104 and/or end wall 106 (the cathode) so that the liner 108 may tend to oxidize by losing electrons before the metal of the side wall 104 and/or end wall 106. In this arrangement, electrons may be stripped from the liner 108 and conducted to the side wall 104 and/or end wall 106, with a pathway for the electrons being provided by the product 110 (the electrolyte). In various embodiments, for example, the side wall 104 or end wall 106 may comprise steel or aluminum while the liner 108 comprises magnesium, and in this embodiment, the magnesium may tend to oxidize instead of, or at a quicker rate than, the steel or aluminum. The liner 108 is thereby "sacrificed" to protect the side wall 104 and/or end wall 106 from corrosion.

It should be noted that as a result of the corrosion (oxidation) of the liner 108, metal ions from the liner 108 (the anode) may be released into the product 110 (the electrolyte). In many applications, the release of metal ions from the liner 108 may pose less of a concern than that posed by the release of BPA. If the liner 108 comprises magnesium, for example, the release of magnesium may be considered a beneficial side effect for food or beverage products in that magnesium is essential to human and animal diets, and magnesium deficiency is fairly commonplace. In addition, the release of magnesium may have little if any effect on the taste of the food or beverage. For humans, the taste threshold of magnesium sulfate may be in the range of 400-600 mg/L (compared to 150-210 mg/L for table salt).

Moreover, unlike tinplated steel, in which a steel can is plated with tin, the sacrificial anode liner 108 may protect the metal of the side wall 104 or end wall 106 of a container even in the presence of oxygen. The container 110 may be protected from corrosion, therefore, whether unopened or opened.

Referring again to FIGS. 1-3, to implement the galvanic cell arrangement, a pathway of electrons from the liner 108 to the metal of the side wall 104 or end wall 106 via the food product 110 (the electrolyte) should be provided by configuring the container 100 such that the product 110 makes contact with both the liner 108 and at least a portion of either the metal of the side wall 104 or the metal of the end wall 106. In the illustrated embodiment, the liner 108 lines substantially an entire surface of the side wall 104, while the end wall 106 is at least partially exposed for contact with the product 110, thereby forming a galvanic cell.

The metal of the side wall 104 or the end wall 106 may be one selected to be less active than the metal of the liner 108 so that the liner 108 may function as a sacrificial anode. Example suitable metals for forming the side wall 104 and/or the end wall 106 may include, but are not limited to, steel or aluminum. The liner 108 may comprise magnesium. Pure magnesium or a magnesium alloy, for example, may be suitable for forming the liner 108. An example magnesium alloy may include aluminum-magnesium alloy such as alloy AZ91E.

The liner 108 may be configured to line any portion of the side wall 104 and/or the end wall 106. In some embodiments, the liner 108 may line at least a substantial portion of the side wall 104. For the embodiment illustrated in FIGS. 1-3, the liner 108 may be a sleeve lining substantially an entirety of the inner space 102.

The liner 108 may be in intimate contact with the side wall 104 and/or the end wall 106, or there may be space between the liner 108 and the side wall 104 and/or the end wall 106 as illustrated. Whether there is any space between the liner 108 and the side wall 104 and/or the end wall 106 may depend on which part of the container 100 forms the cathode of the galvanic cell arrangement. If the end wall 106 acts as the cathode, for example, spacing between the liner 108 and the side wall 104 and/or the end wall 106 may not be necessary as the product 110 will have contact to both the end wall 106 and the liner 108. If, however, at least some portion of the side wall 104 acts as the cathode, for example, spacing between the liner 108 and the side wall 104 may be desirable to allow the product 110 to move into the space between the liner 108 and the side wall 104. In some embodiments, the liner 108 may be configured to line only a portion of the side wall 104 such that it may not matter whether there is any space between the liner 108 and the side wall 104 as the product 110 will contact both the side wall 104 and the liner 108.

The liner 108 may be physically coupled to the side wall 104 and/or the end wall 106 of the container 100 using any suitable coupling means. Adhesives such as an alkyd resin, a vinyl acetate resin, a butadiene resin, an acrylic resin, or an oleoresin, for example, may be disposed between the liner 108 and the side wall 104 and/or end wall 106 to couple the liner 108 thereto. In some embodiments, the liner 108 may be mechanically coupled to the side wall 104 during the fabrication of the container 100 by joining the liner 108 and the side wall 104 at the rim 112 of the container (for example, by crimping or otherwise bending the sidewall 104 and the liner 108 for forming the rim 112).

Figure 5:
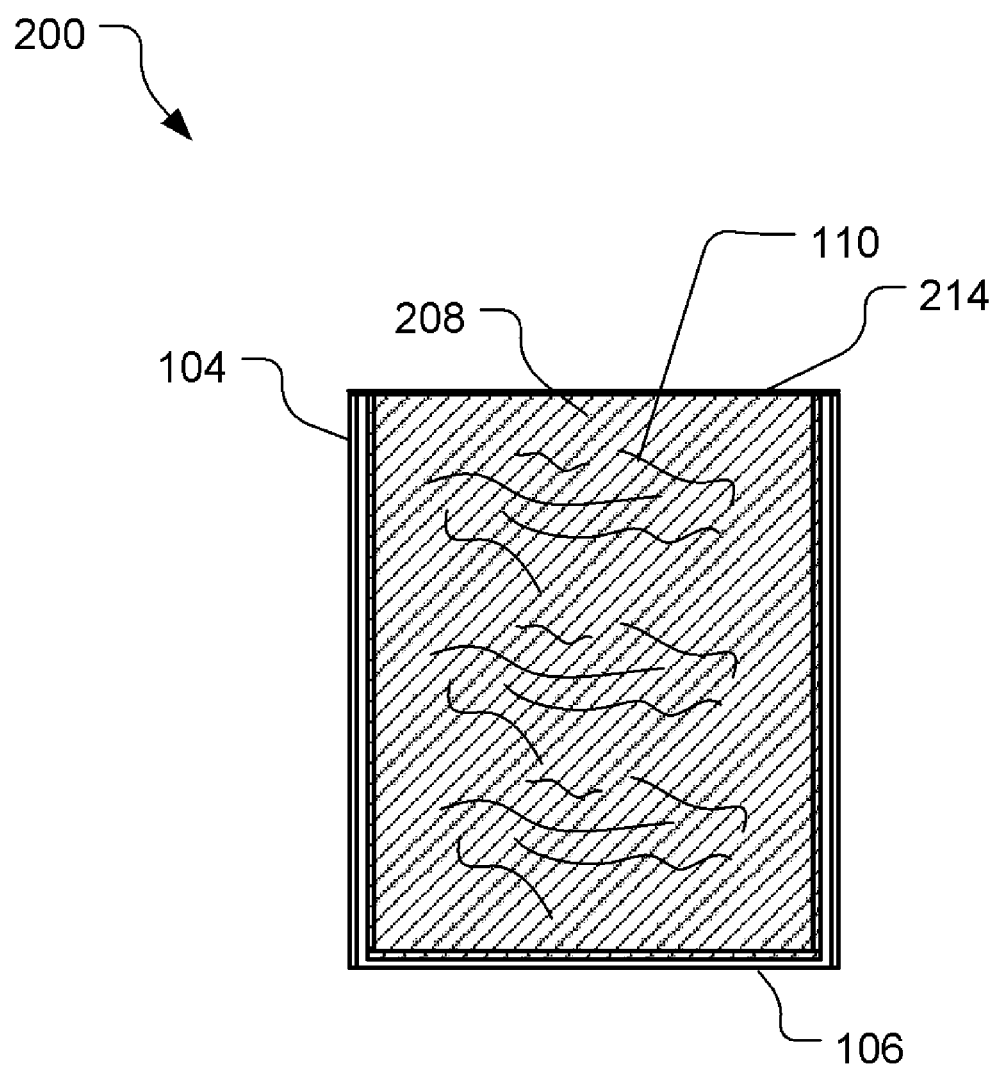
FIG. 5 illustrates a perspective view of another enclosing manufacture having a container including a magnesium sacrificial anode configured as a deep-drawn sheet for corrosion protection.

FIG. 5 is a cross-sectional view of another enclosing manufacture having a container including a magnesium sacrificial anode configured as a deep-drawn sheet, arranged in accordance with at least some embodiments of the present disclosure.

As illustrated, the container 200 may include a deep-drawn sheet liner 208, which may be a continuous piece of metal that lines the side wall 104 and end wall 106 of the container 100. The deep-drawn sheet liner 208 may generally conform to the shape of the inner space of the container defined by the side wall 104 and end wall 106. The deep-drawn liner 208 may be coupled to the side wall and/or end wall 106.

As the deep-drawn sheet liner 208 may essentially form a barrier between the food product 110 and the side wall 104 and the end wall 106, another end wall 214 may be provided to implement the galvanic cell arrangement. The end wall 214 may be formed of a metal such that the metal of the end wall 214 may act as a cathode, the liner 208 may act as sacrificial anode, and the product 110 may act as an electrolyte.

Figure 6:
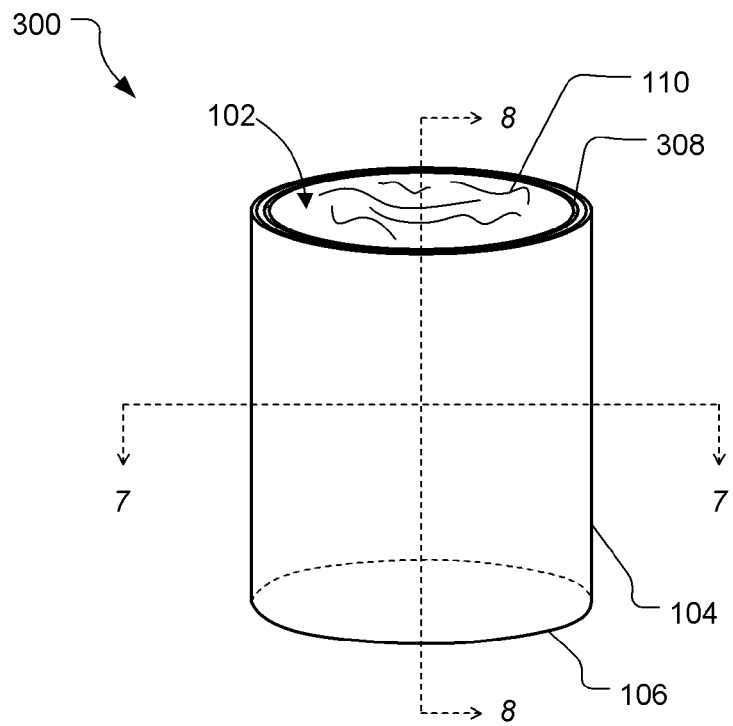
FIG. 6 illustrates a perspective view of another enclosing manufacture having a container including a magnesium sacrificial anode configured as a wire coil for corrosion protection.
Figure 7:
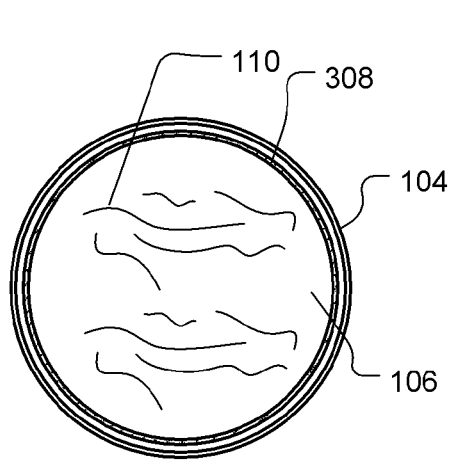
FIG. 7 illustrates a cross-sectional view of the container of FIG. 6.
Figure 8:
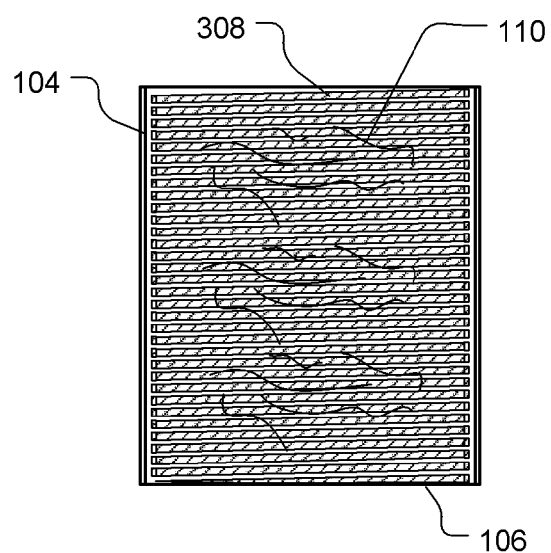
FIG. 8 illustrates another cross-sectional view of the container of FIG. 6.

FIG. 6 illustrates a perspective view of another enclosing manufacture having a container including a magnesium sacrificial anode configured as a wire coil, arranged in accordance with at least some embodiments of the present disclosure. A cross-sectional view of the container taken along line 7-7 is illustrated in FIG. 7, while a cross-sectional view of the container taken along line 8-8 is illustrated in FIG. 8.

As illustrated, a liner 308 may be housed within the inner space 102 of the container 300. The liner 308 may be act as a sacrificial anode to protect the container 300 from corrosion when the container 300 is filled with the product 110. Rather than being configured as a sleeve or a deep-drawn sheet, the liner 308 may instead be a wire coil configured to line at least a portion of the side wall 104. In the illustrated embodiment, the liner 308 may be a wire coil lining the side wall 104 of the container 100.

As the coil structure of the liner 308 allows for flow of product 110 between loops of the coil, the liner 308 may be placed in intimate contact with the side wall 104 while still allowing the product 110 to provide a pathway of electrons from the liner 308 to the metal of the side wall 104. In various other embodiments, however, spacing between the liner 308 and the side wall 104 may be provided.

Figure 9:
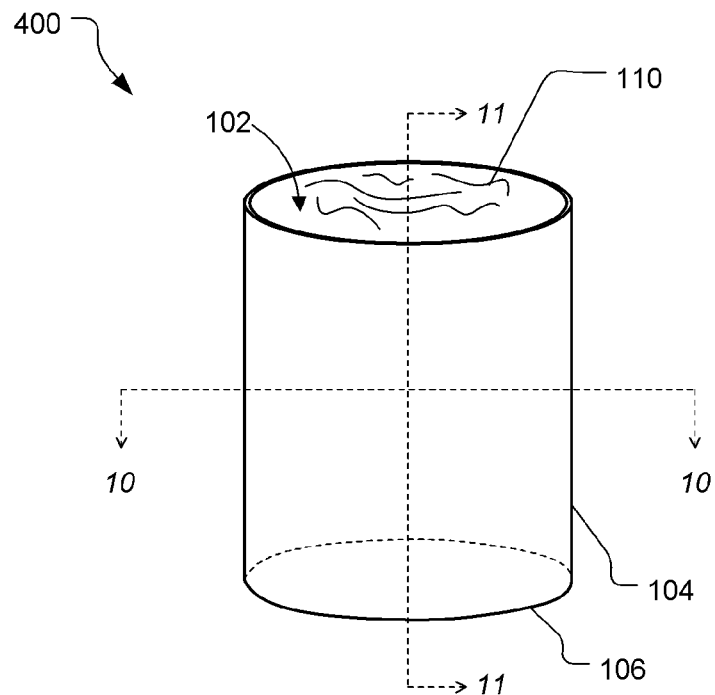
FIG. 9 illustrates a perspective view of another enclosing manufacture having a container including a magnesium sacrificial anode adapted to line an end wall of the container for corrosion protection.
Figures 10, 11:
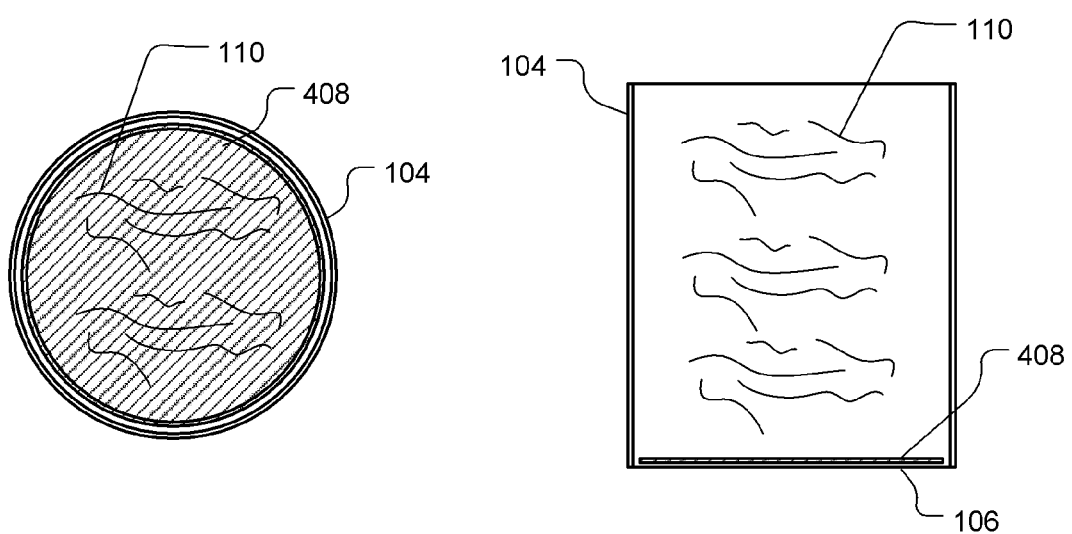
FIG. 10 illustrates a cross-sectional view of the container of FIG. 9.
FIG. 11 illustrates another cross-sectional view of the container of FIG. 9.

FIG. 9 illustrates a perspective view of another enclosing manufacture having a container including a magnesium sacrificial anode adapted to line an end wall of the container, arranged in accordance with at least some embodiments of the present disclosure. A cross-sectional view of the container taken along line 10-10 is illustrated in FIG. 10, while a cross-sectional view of the container taken along line 11-11 is illustrated in FIG. 11.

As illustrated, rather than lining the side wall 104 of the container 400, the liner 408 may instead line the end wall 106 of the container 400. The liner 408 may be similarly shaped to the end wall 106 and may abut the end wall 106. Although the illustrated liner 408 is generally a foil or sheet of metal, in various other embodiments, the liner 408 may instead be a wire coil lining the end wall 106, or may have any other configuration suitable for forming the galvanic cell. For example, the liner 408 may be a sheet of any shape suitable for disposing within in the container 400 while still allowing the container 400 to be filled with the product 110.

Figure 12:
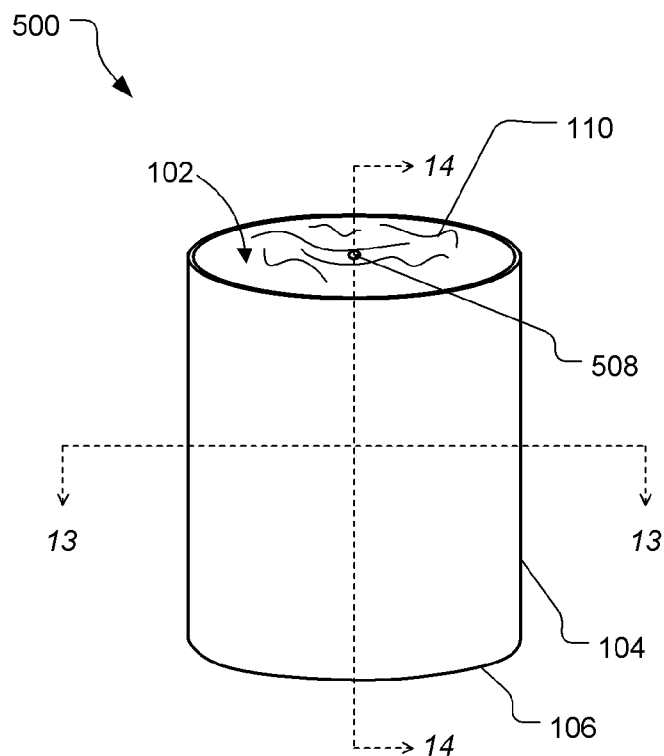
FIG. 12 illustrates a perspective view of another enclosing manufacture having a container including a magnesium sacrificial anode configured as a rod for corrosion protection.
Figure 13:
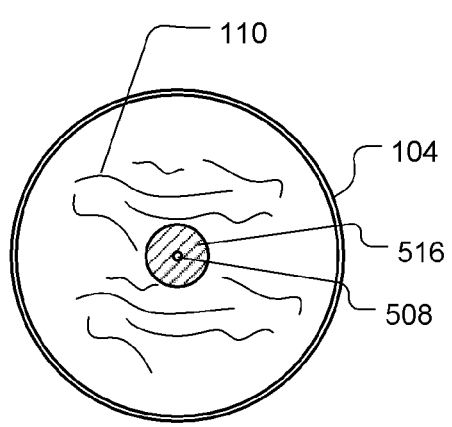
FIG. 13 illustrates a cross-sectional view of the container of FIG. 12.
Figure 14:
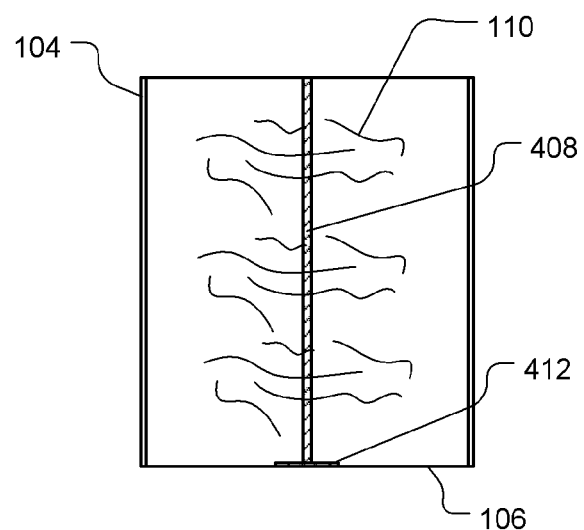
FIG. 14 illustrates another cross-sectional view of the container of FIG. 12.

FIG. 12 illustrates a perspective view of another an enclosing manufacture having a container including a magnesium sacrificial anode configured as a rod, arranged in accordance with at least some embodiments of the present disclosure. A cross-sectional view of the container taken along line 13-13 is illustrated in FIG. 13, while a cross-sectional view of the container taken along line 14-14 is illustrated in FIG. 14.

As illustrated, rather than a liner, the container 500 may include a rod 508 housed within the inner space 102 of the container 500. The rod 508 may act as a sacrificial anode to protect the container 500 from corrosion when the container 500 is filled with the product 110.

The rod 508 may be physically coupled to the end wall 106 of the container 500 using any suitable coupling means including adhesives such as an alkyd resin, a vinyl acetate resin, a butadiene resin, an acrylic resin, or an oleoresin.

As illustrated, the rod 508 may include a flange 516 adapted to facilitate physical coupling of the rod 508 to the end wall 106 of the container 500 by providing a greater surface area for application of an adhesive as compared to that provided by the rod 508 alone. In various embodiments, the increased surface area may result in enhanced adhesion between the flange 512 and the end wall 106. The flange 512 may be integral to the rod 508 or may be welded to the rod 508.

The flange 512 may comprise the same type of metal as the metal of the rod 508, or may instead comprise a different metal than that of the rod 508. In embodiments in which the flange 512 comprises the same type of metal as that of the rod 508, the flange 512 may also function as a sacrificial anode to protect the metallic side wall 104 or end wall 106 from corrosion.

Although the use of the liners and rods described herein may obviate or reduce the need for coatings (BPA coatings, for example) on inner surfaces of the container, a non-BPA coating (not illustrated) may be used in various embodiments. This non-BPA coating may provide further corrosion protection. Suitable non-BPA coatings may include, but are not limited to, an alkyd resin, a vinyl acetate resin, a butadiene resin, an acrylic resin, or an oleoresin.

Figure 15:
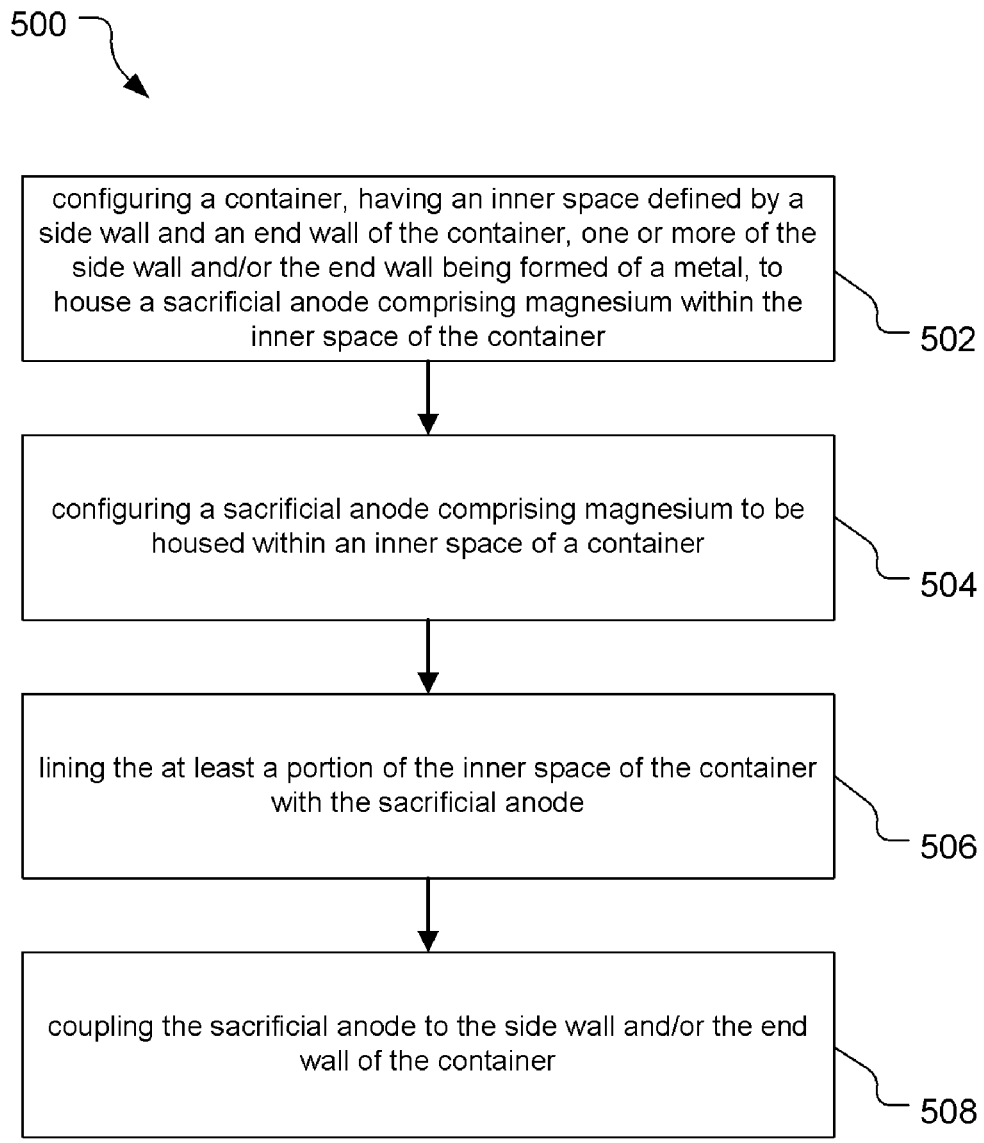
FIG. 15 is a flow diagram of some of the operations associated with a method of making an enclosing manufacture having a container including a magnesium sacrificial anode for corrosion protection.

FIG. 15 is a flow diagram of some of the operations associated with a method for providing protected food or beverage cans, in accordance with at least some embodiments of the present disclosure. It should be noted that although the method is illustrated as a series of sequential steps, the method is not necessarily order dependent. Moreover, methods within the scope of this disclosure may include more or fewer steps than that illustrated.

The method 500 may include one or more functions, operations, or actions as is illustrated by block 502, block 504, block 506, and/or block 508. Processing for the method 500 may start with block 502, "configuring a container, having an inner space defined by a side wall and an end wall of the container, one or more of the side wall and/or the end wall being formed of a metal, to house a sacrificial anode comprising magnesium within the inner space of the container." At block 502, a container having an inner space defined by a side wall and an end wall of the container may be provided. At least one of the side wall and the end wall may be formed of a metal.

From block 502, the method 500 may proceed to block 504, "configuring a sacrificial anode comprising magnesium to be housed within an inner space of a container." At block 504, sacrificial anode may be configured to line at least a portion of a side wall of the inner space of the container and/or an end wall of the inner space of the container. The sacrificial node may be configured by deep-drawing a sheet of magnesium. In other embodiments, the sacrificial node may be configured by forming a wire coil of magnesium, the wire coil being adapted to line at least a portion of an end wall of the inner space of the container.

The sacrificial anode may comprise pure magnesium or a magnesium alloy, and the metal of the side wall or the end wall of the container may be one selected to be less active than the magnesium of the sacrificial anode. Example suitable metals for forming the side wall and/or the end wall may include, but are not limited to, steel or aluminum.

From block 504, the method 500 may proceed to block 506, "lining the at least a portion of the inner space of the container with the sacrificial anode." At block 506, at least a portion of the inner space of the container may be lined with the sacrificial anode. In various embodiments, at least a substantial portion of the side wall and/or end wall of the container may be lined with the sacrificial anode. In various embodiments, the lining may comprise placing a liner similarly shaped to the end wall within the container, against the end wall. Similarly, in various embodiments, the lining may comprise placing a liner similarly shaped to the side wall within the container, against the side wall.

From block 506, the method 500 may proceed to block 508, "coupling the sacrificial anode to the side wall and/or the end wall of the container." At block 508, the sacrificial anode may be coupled to the side wall and/or the end wall of the container using an adhesive such as an alkyd resin, a vinyl acetate resin, a butadiene resin, an acrylic resin, or an oleoresin. In some embodiments, the sacrificial anode may be mechanically coupled to the side wall of the container during the fabrication of the container by joining the sacrificial anode and the side wall and/or the end wall at the rim of the container. Other coupling means may be similarly suitable.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. An article of manufacture comprising:
    an enclosing body having a side wall and an end wall;
    a metallic surface within an interior space between the side wall and the end wall of the enclosing body; and
    a wire coil configured to serve as a liner extending along at least a portion of the side wall within the interior space of the enclosing body such that a portion of the interior space, but not the entire interior space, is surrounded by the wire coil liner and a portion of the metallic surface, but not the entire metallic surface, is at least partially exposed, wherein the wire coil liner is configured to operate as a sacrificial anode effective to protect the metallic surface from corrosion.

2. The article of manufacture of claim 1, wherein the wire coil liner comprises a magnesium alloy.

3. The article of manufacture of claim 1, wherein the wire coil liner is disposed in a manner that provides a gap between the portion of the side wall and the wire coil liner.

4. The article of manufacture of claim 1, wherein the metallic surface comprises steel or aluminum.

5. The article of manufacture of claim 1, wherein the wire coil liner comprises magnesium.

6. The article of manufacture of claim 1 wherein the end wall is configured to operate as a cathode.

7. The article of manufacture of claim 1, wherein the metallic surface, the wire coil liner, and a food or beverage product housed within the interior space are configured to form a galvanic cell, wherein the metallic surface is configured to operate as a cathode, and the food or beverage product is configured to operate as an electrolyte.

8. A method for providing an article of manufacture, comprising:
    configuring a container, having an inner space defined by a side wall and an end wall of the container, to house a sacrificial anode within the inner space of the container, wherein at least one of the side wall or the end wall of the container is formed of a metal;

configuring the sacrificial anode with a wire coil; and
lining a portion of the inner space, but not the entire inner space, with the sacrificial anode.

9. The method of claim 8, further comprising:
coupling the sacrificial anode to the side wall or the end wall of the container.

10. The method of claim 8, wherein configuring the sacrificial anode with a wire coil comprises forming a wire coil of magnesium or magnesium alloy to form at least one portion of the sacrificial anode.

* * * * *

UNITED STATES PATENT AND TRADEMARK OFFICE
CERTIFICATE OF CORRECTION

PATENT NO. : 8,163,159 B2  
APPLICATION NO. : 12/626017  
DATED : April 24, 2012  
INVENTOR(S) : Sjong Page 1 of 1

It is certified that error appears in the above-identified patent and that said Letters Patent is hereby corrected as shown below:

On the Title Page, in Field (56), under "OTHER PUBLICATIONS", in Column 2, Line 4, delete "Complemetary" and insert -- Complementary --, therefor.

In Column 2, Line 51, delete "equivalents" and insert -- equivalents. --, therefor.

In Column 3, Line 62, delete "container 110" and insert -- container 100 --, therefor.

In Column 4, Line 54, delete "sidewall" and insert -- side wall --, therefor.

In Column 8, Line 53, in Claim 6, delete "claim 1" and insert -- claim 1, --, therefor.

Signed and Sealed this
Nineteenth Day of June, 2012

David J. Kappos
*Director of the United States Patent and Trademark Office*